United States Patent [19]

Naylor

[11] Patent Number: 5,369,740

[45] Date of Patent: Nov. 29, 1994

[54] VERSATILE PROGRAMMABLE ELECTRONIC CONTROLLER

[75] Inventor: Michael A. Naylor, Indianapolis, Ind.

[73] Assignee: Emerson Electric Co., St. Louis, Mo.

[21] Appl. No.: 758,754

[22] Filed: Sep. 12, 1991

[51] Int. Cl.$^5$ .............................................. G06F 15/46
[52] U.S. Cl. ..................... 364/140; 364/146; 364/DIG. 2; 364/926.9; 364/949
[58] Field of Search ................. 364/140–147, 364/188, 189, 483, DIG. 1 MS File, DIG. 2 MS File; 395/800, 750, 275

[56] References Cited

U.S. PATENT DOCUMENTS

| | | | |
|---|---|---|---|
| 4,349,878 | 9/1982 | Grimm | 364/484 |
| 4,371,922 | 2/1983 | Fujita et al. | 364/144 |
| 4,679,135 | 7/1987 | Kobayashi et al. | 364/146 |
| 4,797,820 | 1/1989 | Wilson et al. | 364/143 X |
| 4,823,254 | 4/1989 | Takada et al. | 364/146 X |
| 5,027,049 | 6/1991 | Pratt et al. | 318/807 |

*Primary Examiner*—Joseph Ruggiero
*Attorney, Agent, or Firm*—Robert F. Meyer; Eric R. Waldkoetter

[57] ABSTRACT

A universal controller is provided with a variable annunciation and display of information with a variety of pre-selected output graphics and indicia, programmability to control a variety of processes and machines in a variety of applications with a variety of pre-selected input graphics and indicia, manufacturability as a standard unit in large numbers, variable programming for its different applications, and containability in a small, easily operated unit.

20 Claims, 22 Drawing Sheets

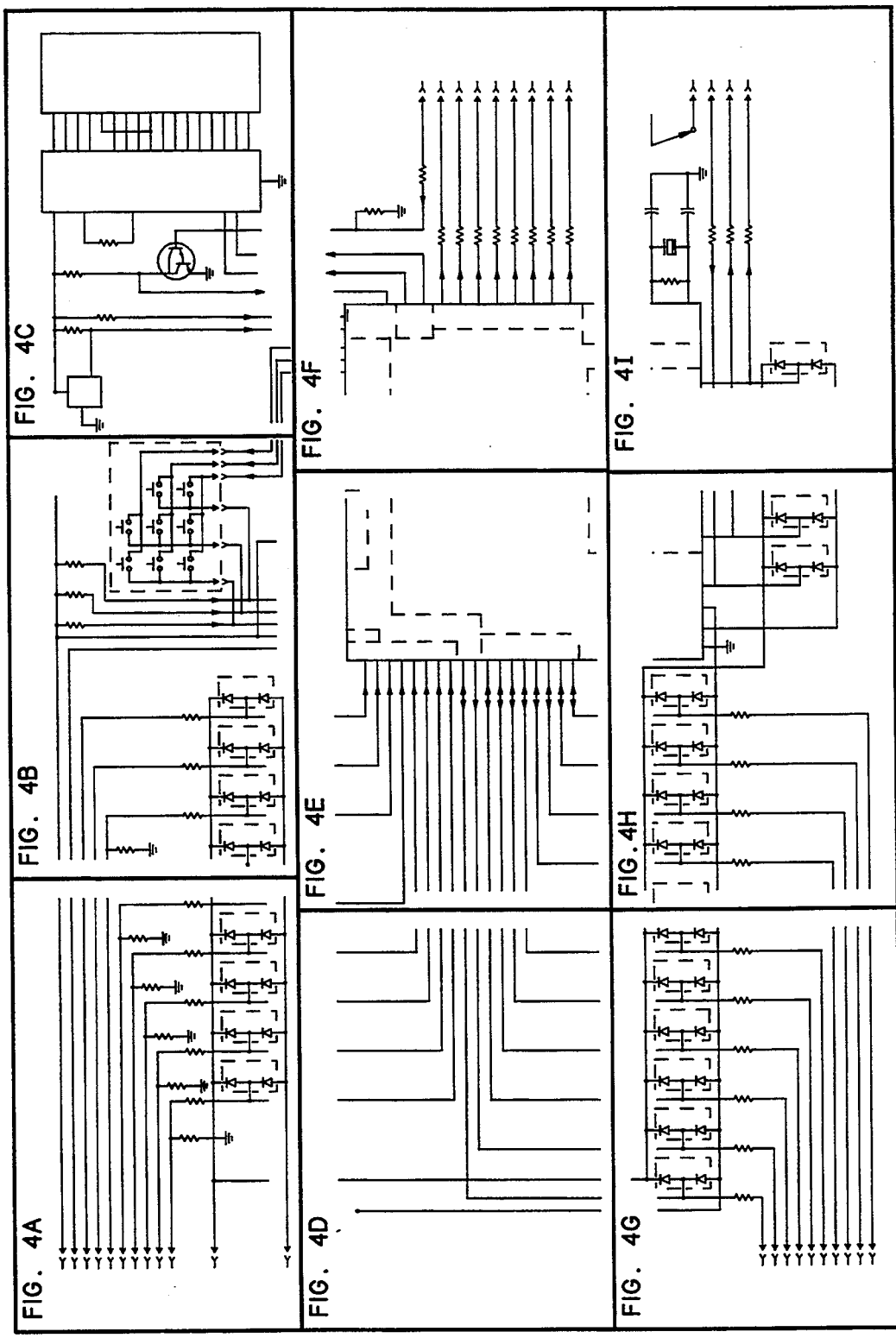

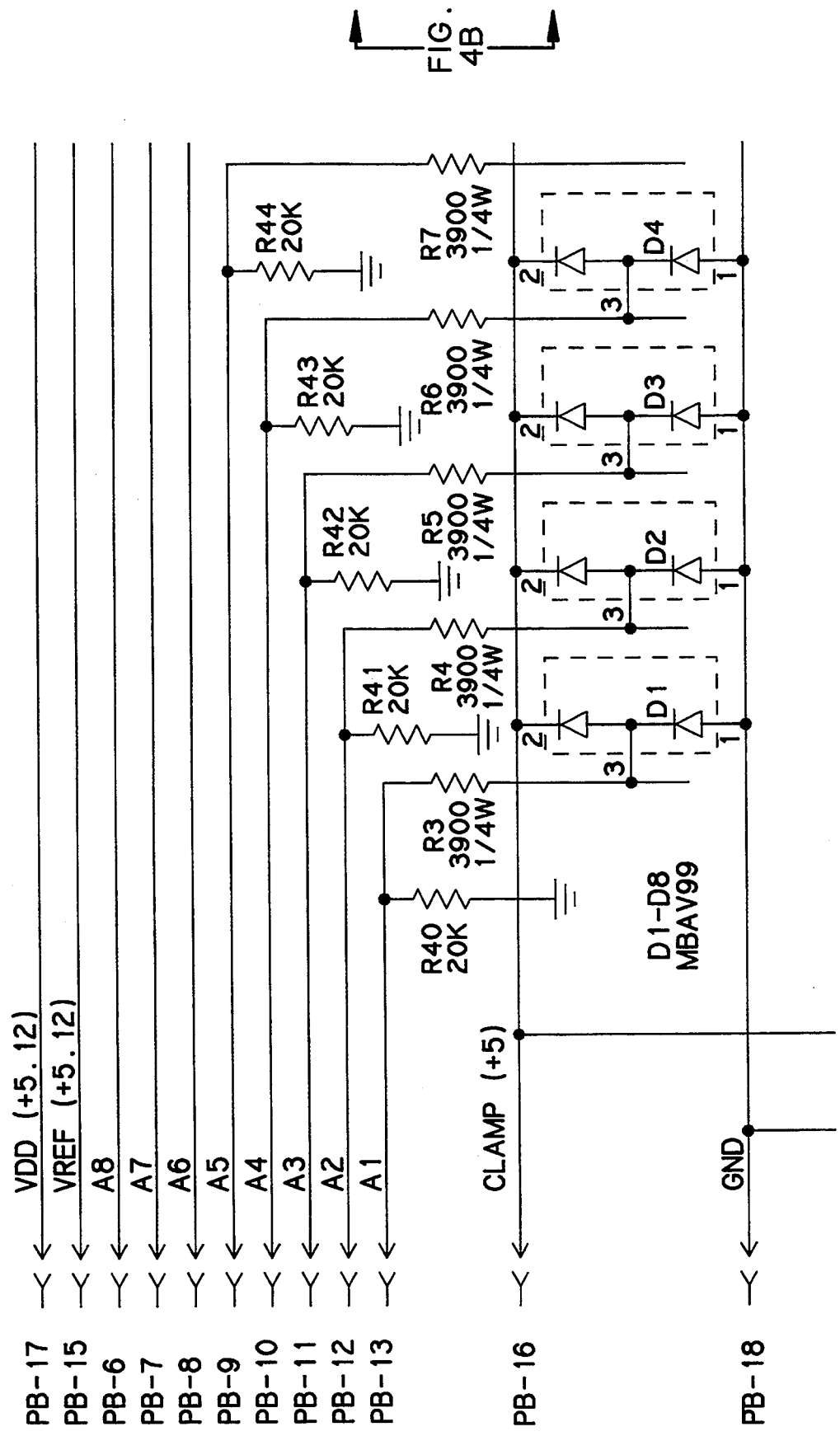

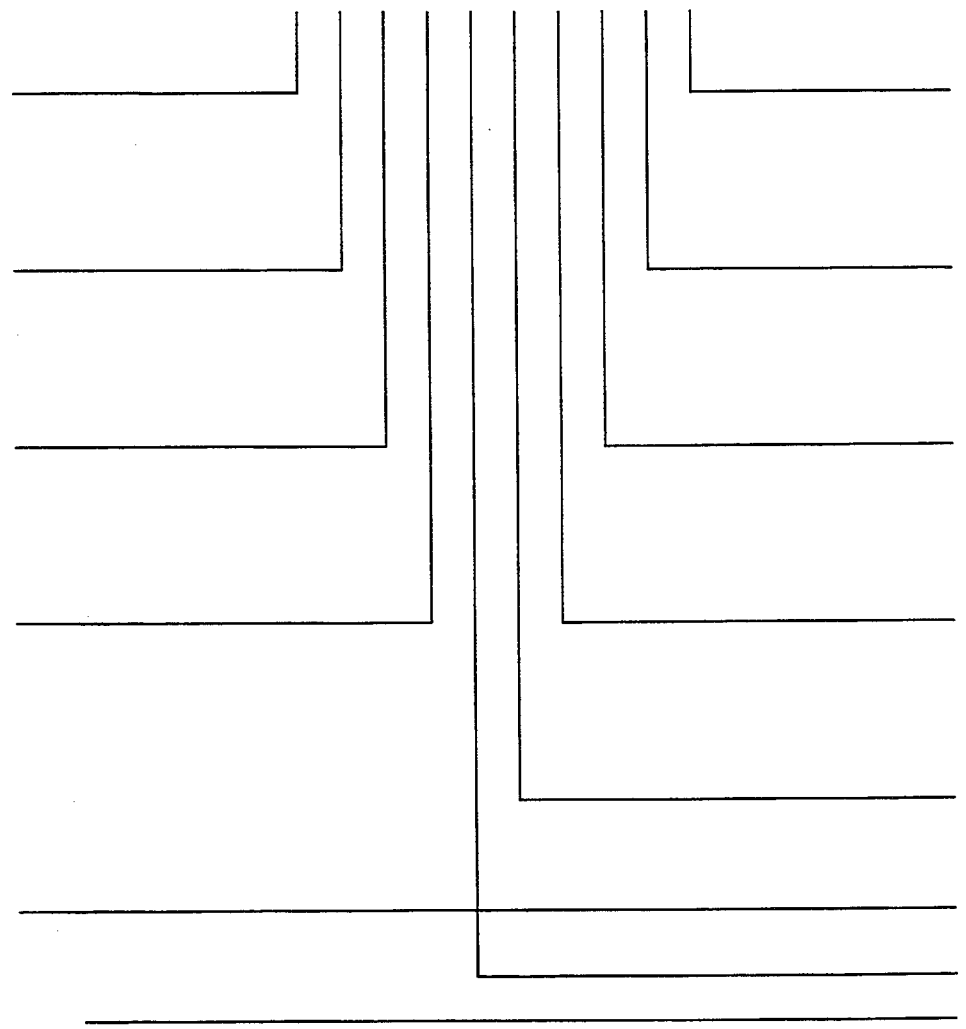

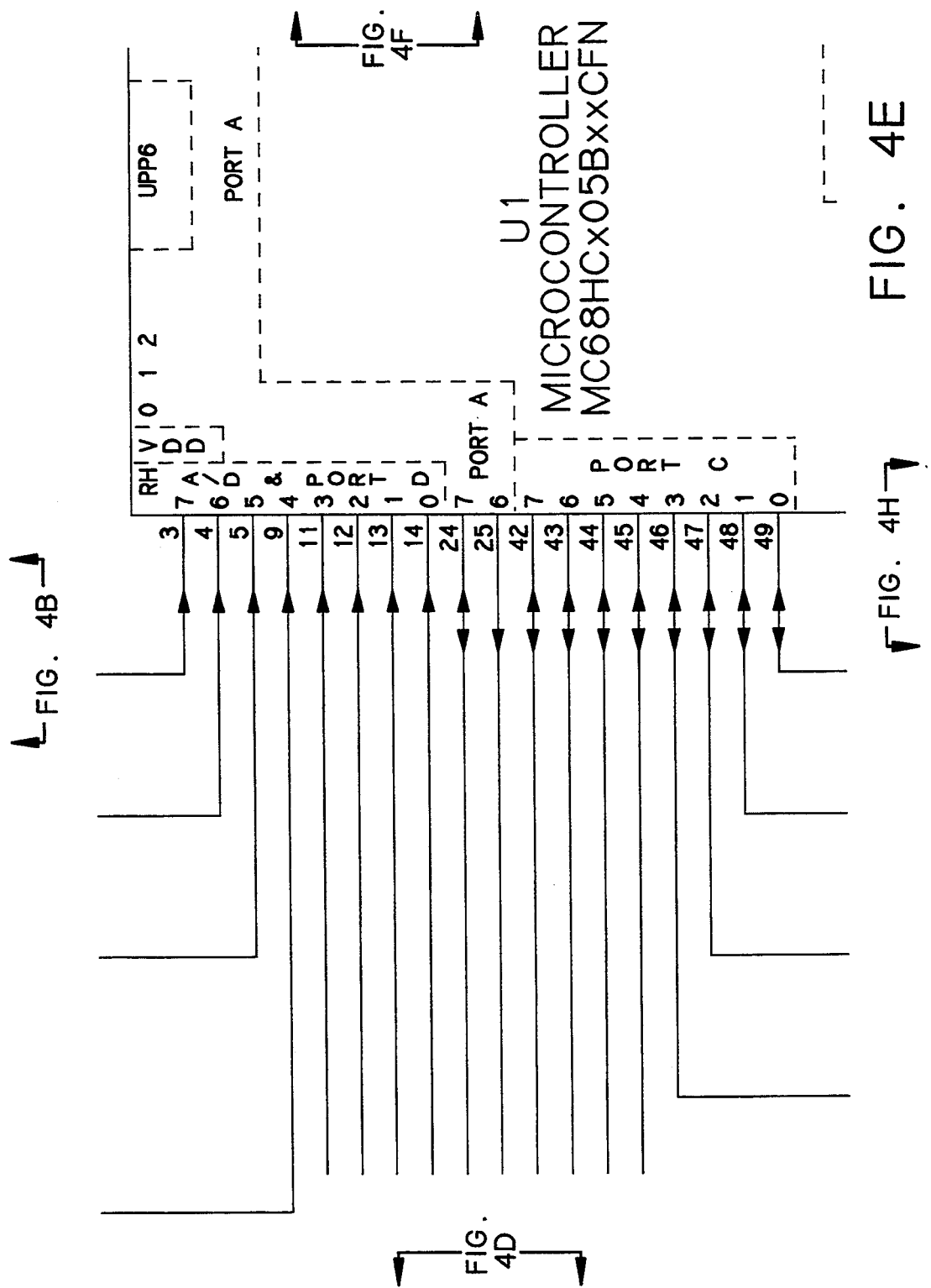

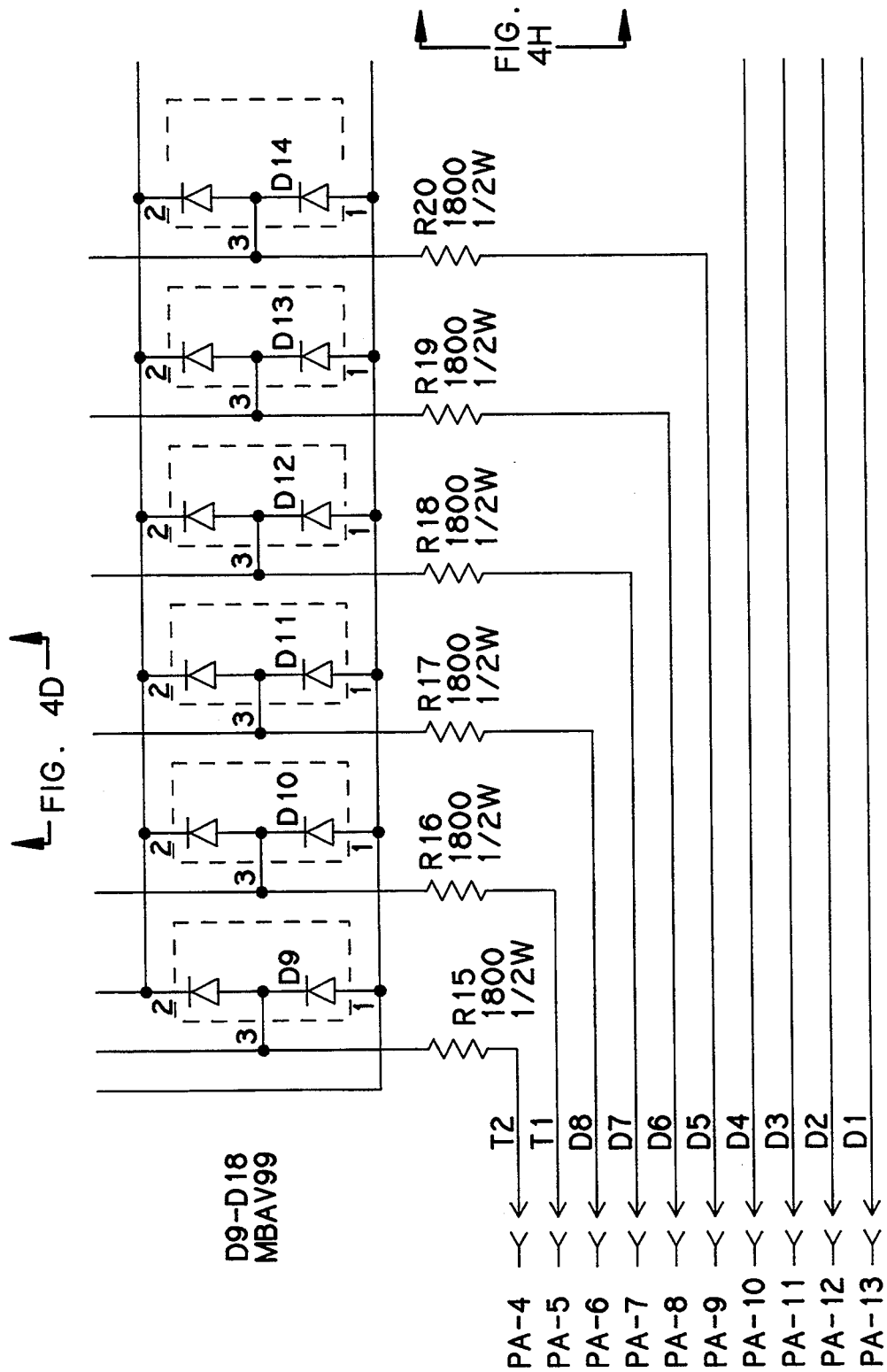

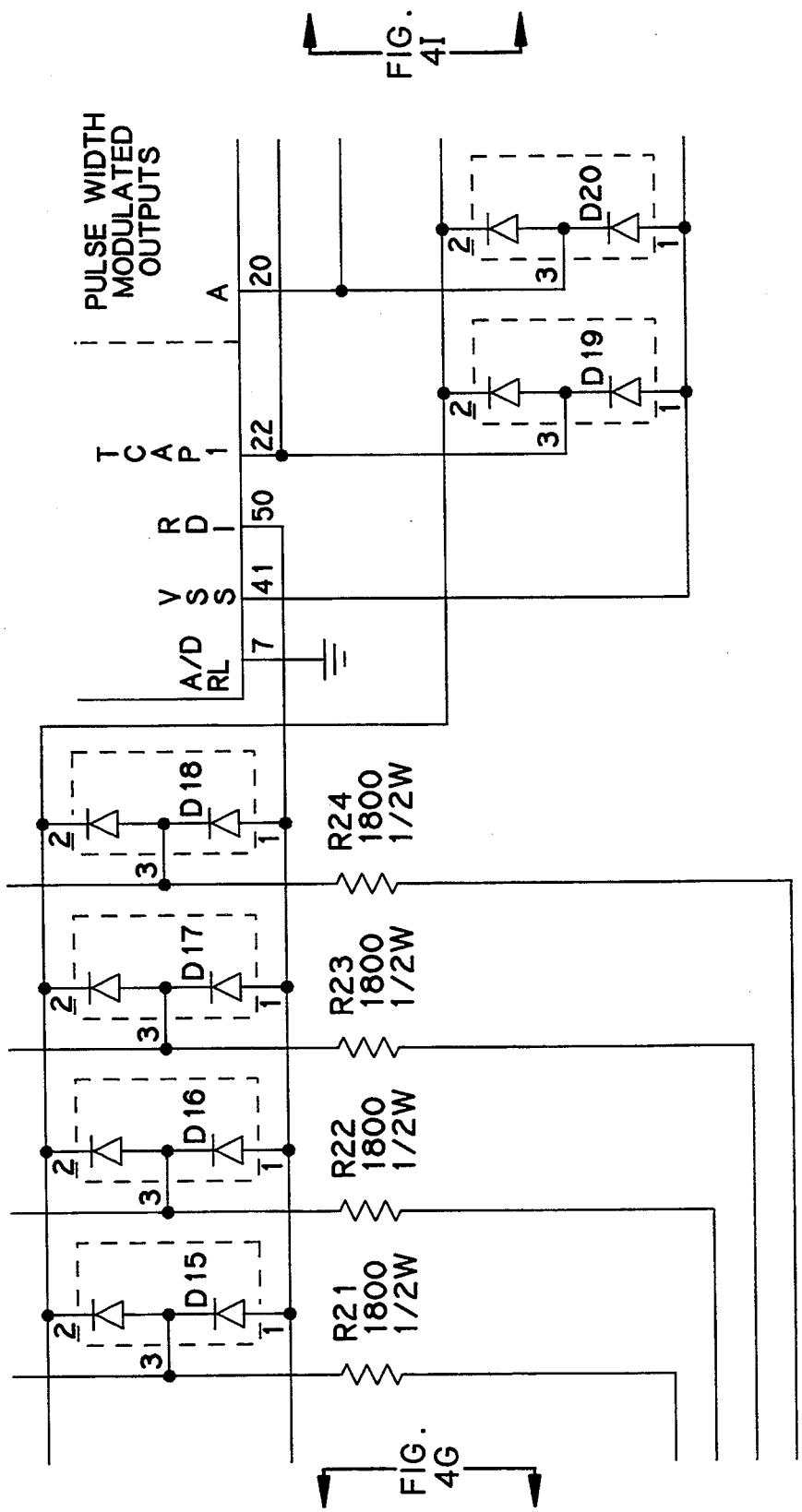

5,369,740

VERSATILE PROGRAMMABLE ELECTRONIC CONTROLLER

FIELD OF THE INVENTION

This invention relates to methods and apparatus for universal control and universal controllers. This invention more particularly relates to means for providing variable annuniciation of information by controllers and universal controller apparatus.

BACKGROUND OF THE INVENTION

Standard pre-programmed controllers are available in the marketplace but such standard pre-programmed controllers are costly and have limited applicability and fixed displays corresponding to their application. Programmable controllers are also available but such controllers are also costly, include standard keypads for programming and entry of information, and frequently require programming to display output information.

Notwithstanding the existing available controllers, there is a need for a programmable universal controller that may be manufactured as a standard unit, programmed to be applicable in a universe of applications with a variety of related graphic input and output indicia selectable by the user and sellable at low cost in quantities of a few hundred to a few thousand units.

DISCLOSURE OF THE INVENTION

As a result of the invention, a universal controller may be provided with a variable annunciation and display of information with a variety of pre-selected output graphics and indicia, programmability to control a variety of processes and machines in a variety of applications with a variety of pre-selected input graphics and indicia, manufacturability as a standard unit in large numbers, variable programming for its different applications, and containability in a small, easily operated unit.

In the invention, a variable annunciation or display of information in a controller is obtained by providing a controller with a variable area illumination means having a plurality of distributed independently illuminatable areas, and providing a transparent sheet overlying the variable area illumination means and having a plurality of indicia sites, each of which overlie one of the plurality of independently illuminatable areas of the variable area illumination means and carry selected indicia so that by operation of the variable area illumination means, a controller can select and illuminate one or more indicia sites of the transparent sheet to display the indicia.

The invention further comprises means for providing a variable annuniciation of information including an operable variable area illumination means having a plurality of distributed independently illuminatable areas and a transparent indicia-bearing sheet adapted to overlay the variable area illumination means and provide a plurality of indicia, each of the indicia being located over one of the plurality of independently illuminatable areas of the variable area illumination means so that the variable area illumination means may illuminate and display selected indicia of the transparent sheet. Such means can further comprise a plurality of switches in a planar array adjacent the variable area illumination means and the transparent indicia-bearing sheet may also overlie the planar array of switches and bear indicia to identify the function of the underlying switches. In preferred embodiments, the variable area illumination means can include an area for the presentation of variable alphanumeric information from a controller, and a transparent and non-indicia-bearing portion of the transparent sheet can overlay the variable area illumination means.

The apparatus of the invention further includes a universal controller including a programmable controller, a variable area illumination means, a plurality of control switches and a transparent indicia-bearing overlay carrying a plurality of different indicia in different sites to identify, in part, the control switches and, in part, controller outputs so that operation of the variable area illumination means by the programmable controller illuminates one or more of the plurality of different indicia to display selected controller outputs.

Preferred embodiments of such controllers include programmable microprocessors including a non-volatile programmable read only memory, a random access memory and a non-volatile electrically erasable read only memory. The programmable read only memory of the controller is capable of storing a variety of control programs, and the electrically erasable read only memory is programmable from a plurality of control switches to store in its non-volatile memory circuits selectable input and control information and to display that information in response to operation of the control switches.

Such controllers have a variety of other novel features which will be apparent from the drawings and the description that follow.

DETAILED DESCRIPTION OF THE INVENTION

Figure 1:
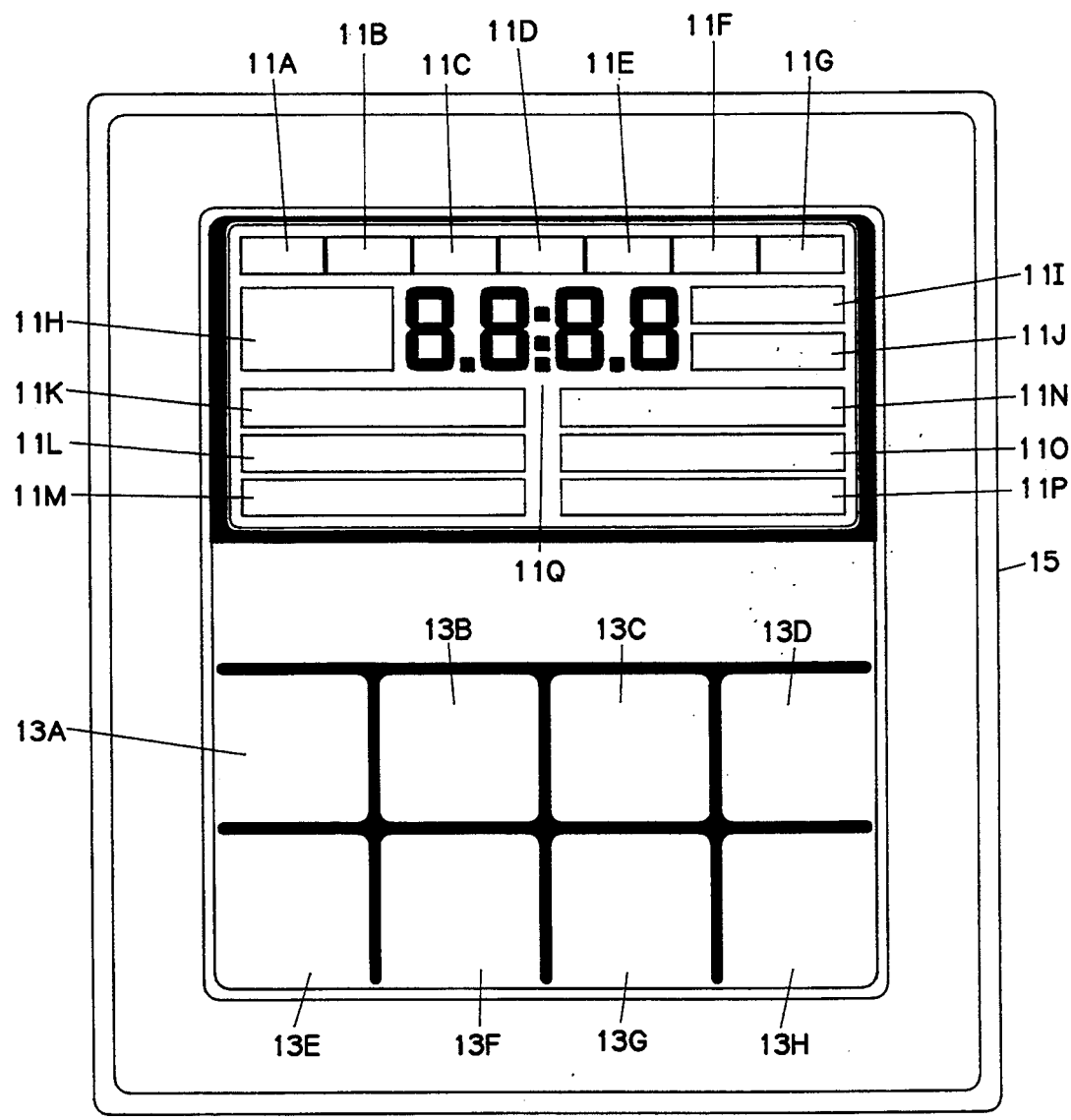
FIG. 1a is a front view of one controller of the invention to illustrate a variable area illumination means.
Figure 2:
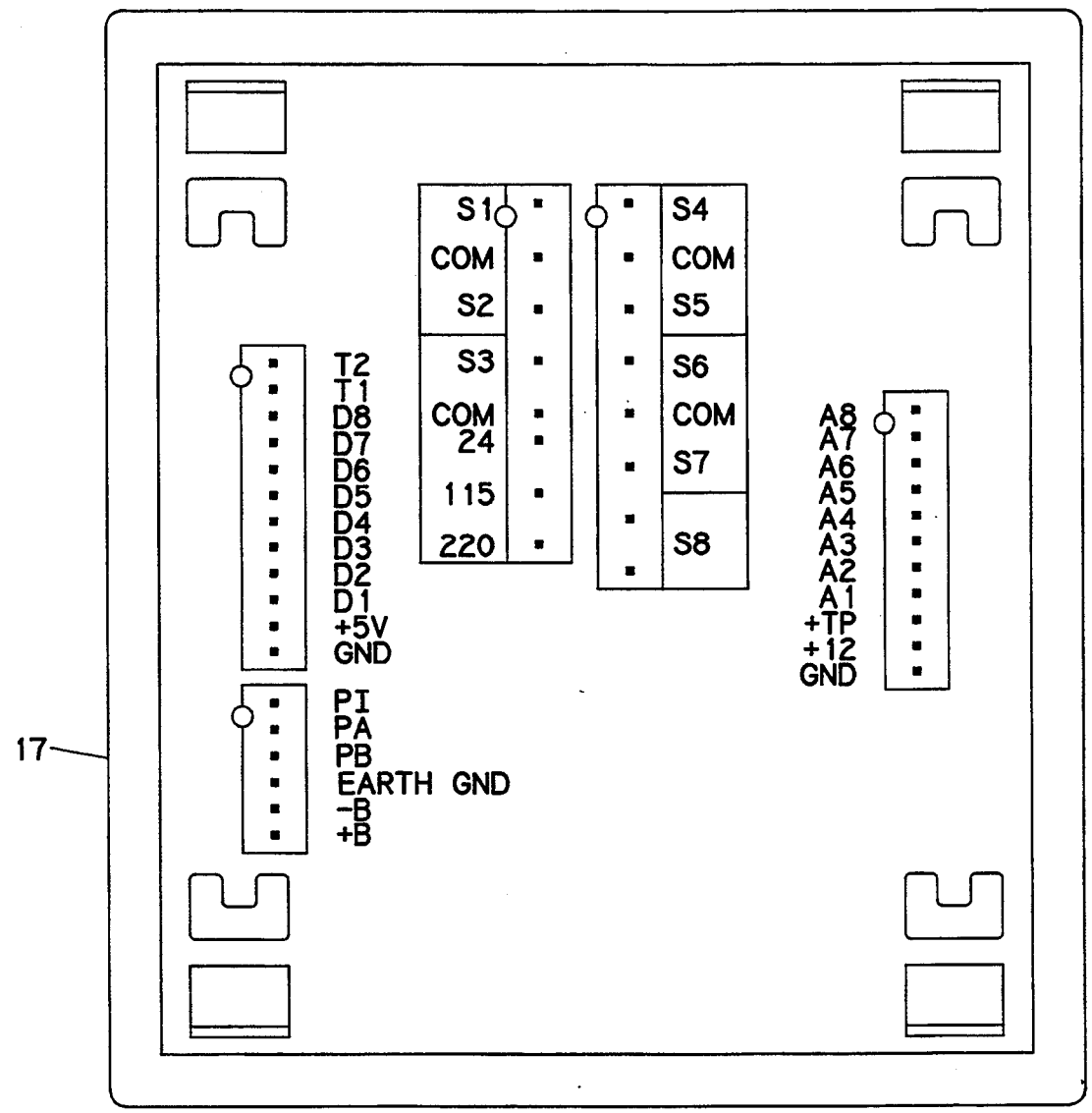
FIG. 2 is a back view of a universal controller of the invention illustrating one arrangement of connections to the controller.
Figure 5:
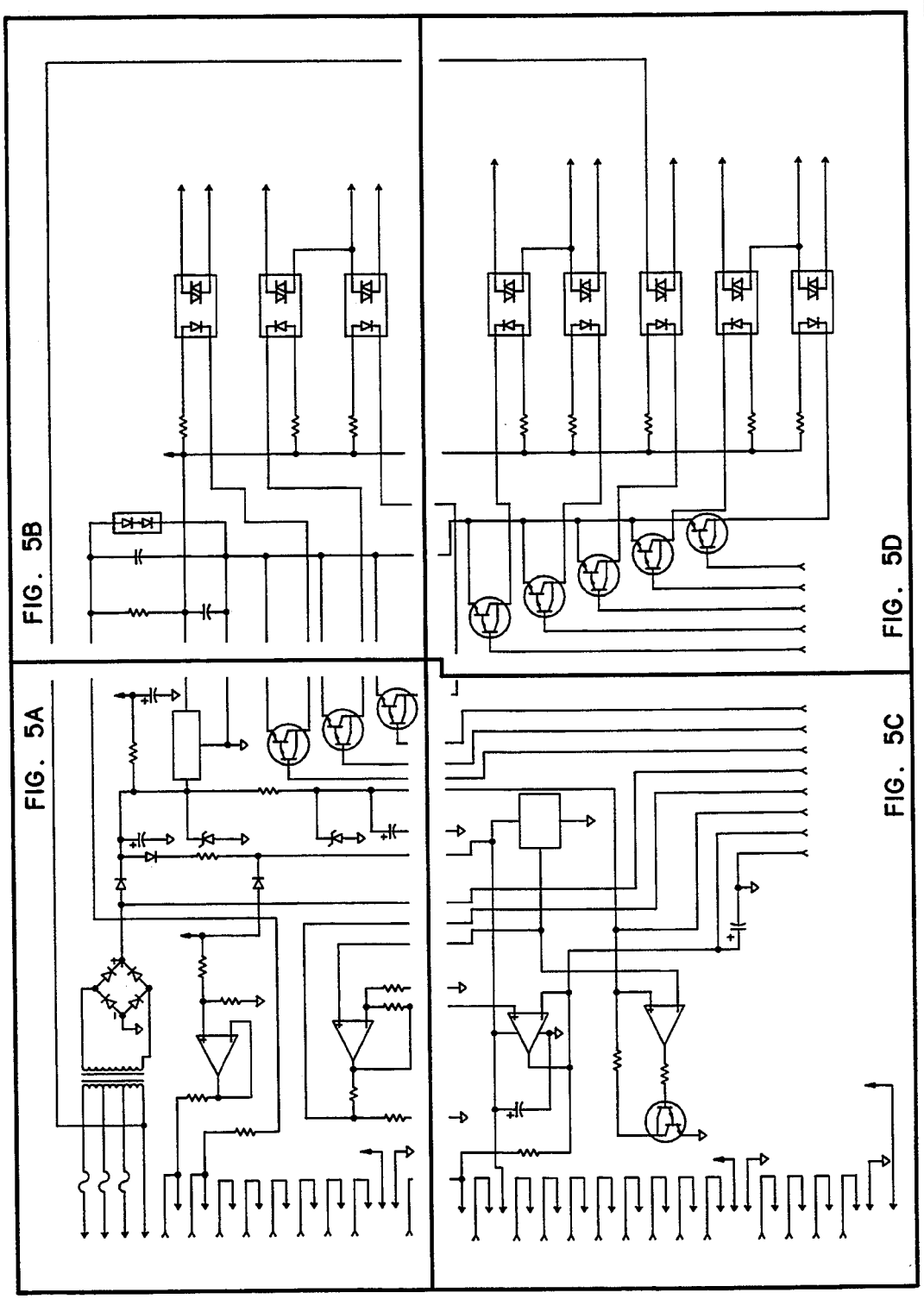
Figure 5A:
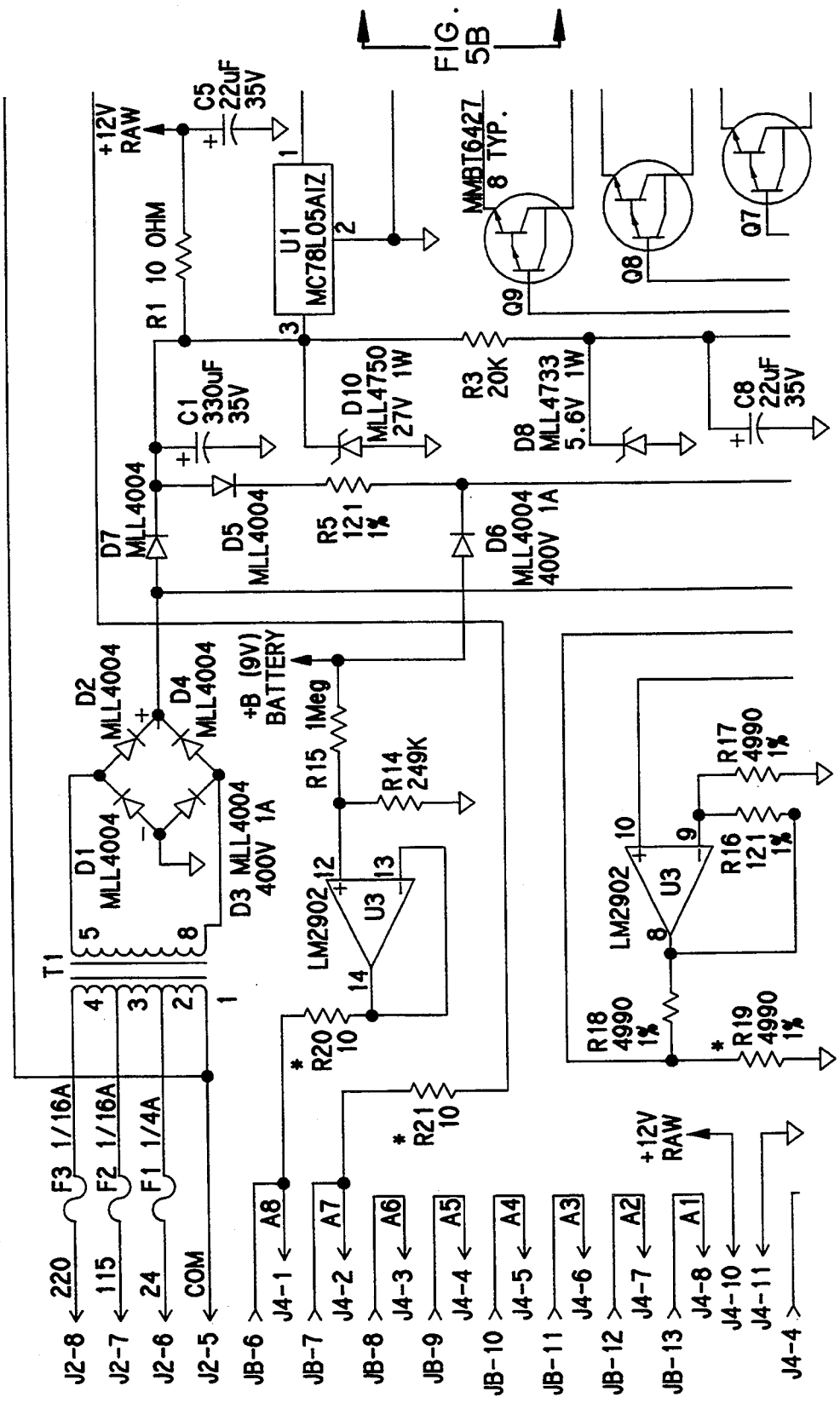
Figure 5B:
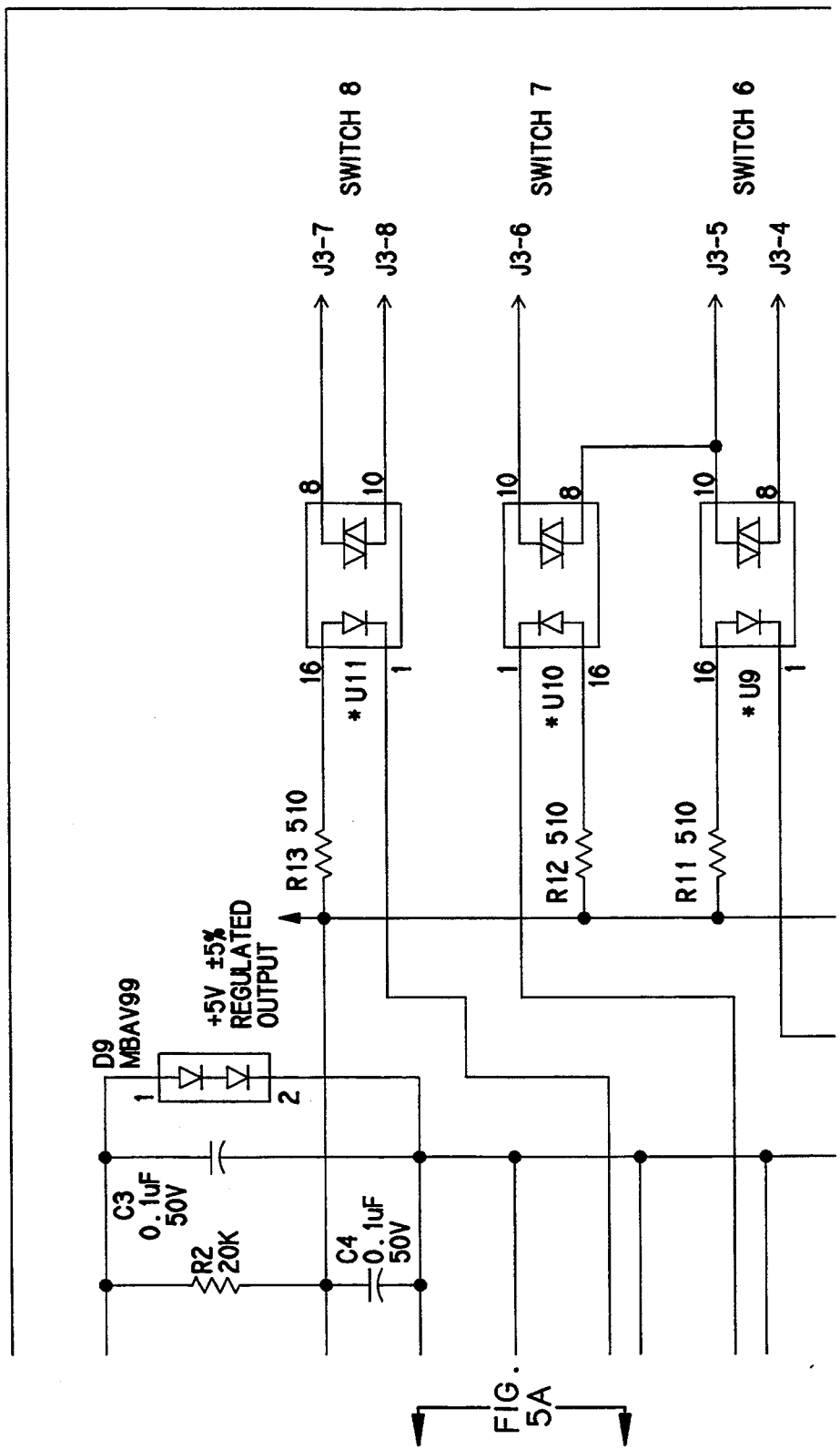
Figure 5C:
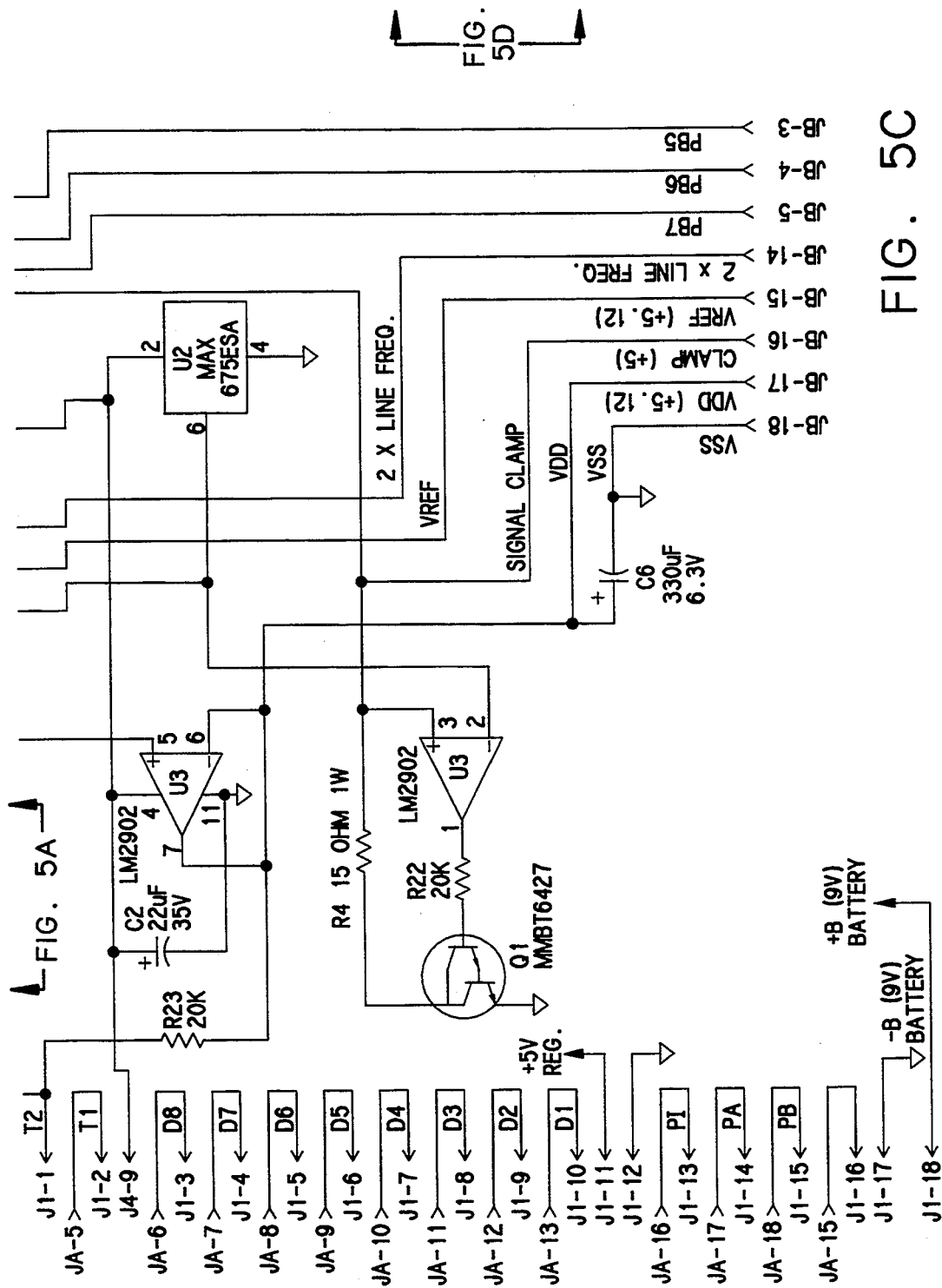
Figure 5D:
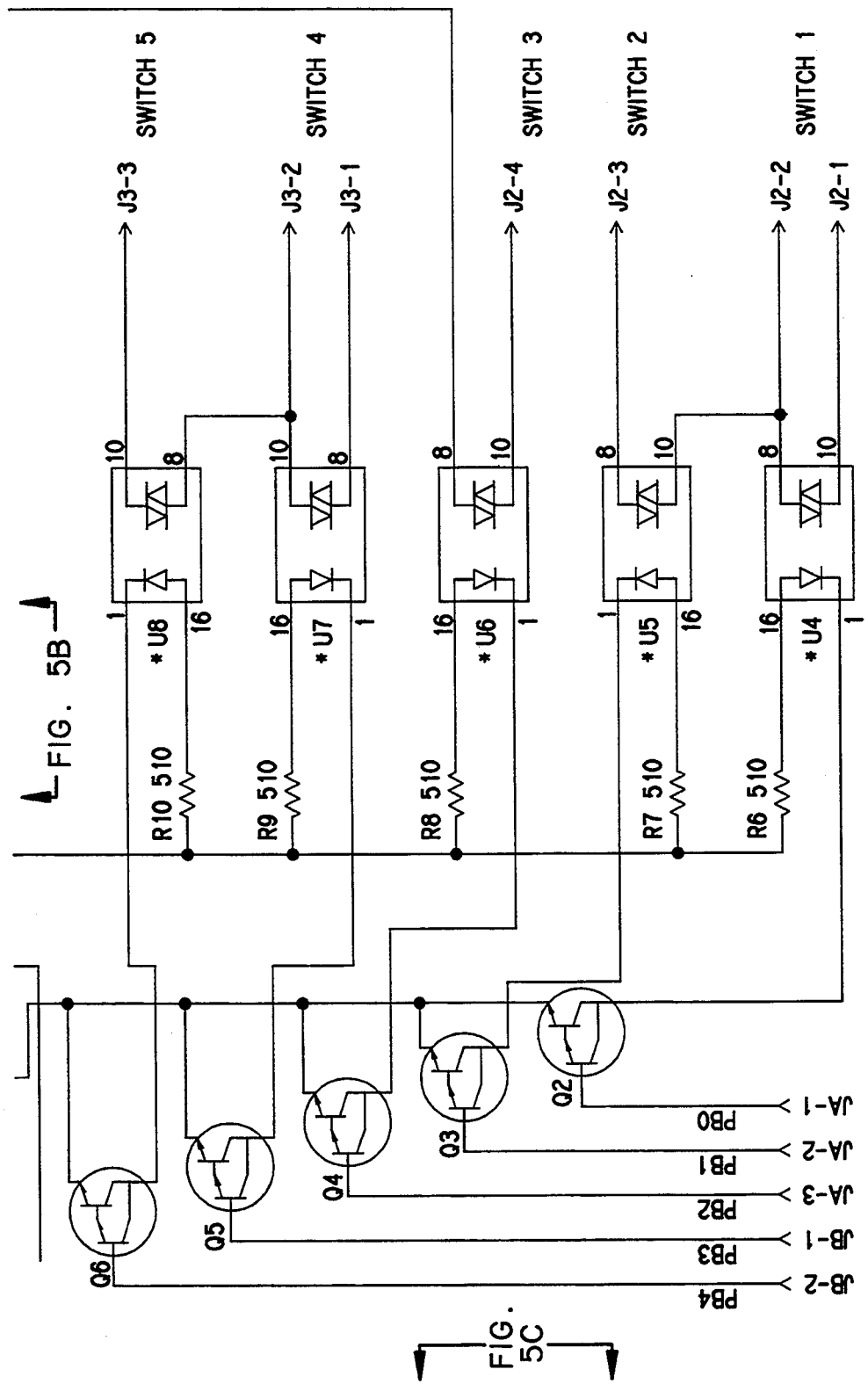

FIGS. 1–5 illustrate a preferred embodiment of the invention. While FIGS. 1–3 show the structure and FIGS. 4–5 show the circuits of this preferred embodiment, the invention, in its broadest aspects, is not limited to the structure of FIGS. 1–3 or the circuits of FIGS. 4–5.

In its broader aspects, the invention provides a method and apparatus for variable annunciation or display of information in a universal controller. FIGS. 3B–3E show one such means 10 of the invention for providing a variable annunciation and display of information. The means 10 includes an operable variable area illumination means 11 having a plurality of distributed independently illuminatable areas, shown in FIG. 1 as 11a–11p. Although the plurality of distributed independently illuminatable areas shown in FIG. 1 comprise sixteen such areas, fewer illuminatable areas may be provided. The means 10 further comprises a transparent indicia-bearing sheet 12 adapted to overlay the variable area illumination means 11 and provide a plurality of indicia, each indicia of said plurality of indicia being located over one of said plurality of independently illuminatable areas 11a–11p of the variable area illumination means 11 so that the variable area illumination means 11 may illuminate and display selected indicia of the transparent sheet 12. FIGS. 3B, 3C and 3E show one example of indicia provided on the transparent indicia-bearing sheet 12.

As indicated in FIG. 1, the variable area illumination means comprises a screen divided into a plurality of individually electrically operated display areas 11a–11p. Such a variable area illumination means is preferably a liquid crystal screen having a plurality of areas 11a–11p that may be individually operated by an electrical output to change between a reflective and a non-reflective state, as shown in FIGS. 3C–3E. When the illuminatable areas 11a–11p of such a liquid crystal screen are in a non-reflective state, the overlying indicia of the transparent indicia-bearing sheet are not displayed as indicated in FIG. 3D; however, when one or more of the independently illuminatable areas 11a–11p are operated to change to a reflective state, indicia on the transparent indicia-bearing sheet overlying the illuminated area is illuminated and displayed, as shown in FIG. 3E. Such an LCD variable area illumination means may be obtained from any supplier of liquid crystal devices. One such supplier is the Hamlin Division of Standish Industries of Lake Mills, Wis.

As indicated in FIGS. 1 and 3, a preferred variable area illumination means includes an area that may be operated to display alphanumeric information. As indicated in FIG. 1, the plurality of distributed independently illuminatable areas 11a–11p comprise an array arranged about a central area 11q adapted to display variable alphanumeric information. The transparent indicia-bearing sheet 12, while provided with indicia matching the array of independently illuminatable areas 11a–11p, includes a clear central area to permit the display of the variable alphanumeric information.

As also indicated in FIGS. 1 and 3, the means 10 can further comprise a plurality of switches 13a–13h in a planar array adjacent the variable area illumination means 11. As indicated in FIG. 3, the transparent indicia-bearing sheet 12 may also overlie the planar array of switches 13a–13h and bear indicia to identify the function of the switches. As further shown in FIG. 3A, the means 10 is adapted for connection with a programmable controller 14. In such an application of the means 10, the indicia overlying the plurality of switches 13a–13h identify selected inputs to the programmable controller 14, and the indicia overlying the independently illuminatable areas 11a–11p can identify selected outputs of the programmable controller 14.

The indicia provided on the transparent indicia-bearing sheet can comprise graphics and information of every character and kind, including warnings, names, instructions, letters, numbers, descriptions, symbols and other messages and information-bearing displays.

While a preferred embodiment of the variable area illumination means is a liquid crystal screen having a plurality of areas that may be individually operated to change between a reflective and a non-reflective state. Such variable area illumination means may comprise a liquid crystal screen having a light source behind the screen and being operated by the controller 14 to change individual electrically operated display areas between light blocking and light transmitting states, thereby permitting the light behind the variable area illumination means to illuminate and display the indicia on the transparent indicia-bearing sheet 12. Other variable area illumination means usable in the invention include means providing variable area illumination by vacuum fluorescent light devices, light-emitting diodes, incandescent lights and the like.

Figure 3A:
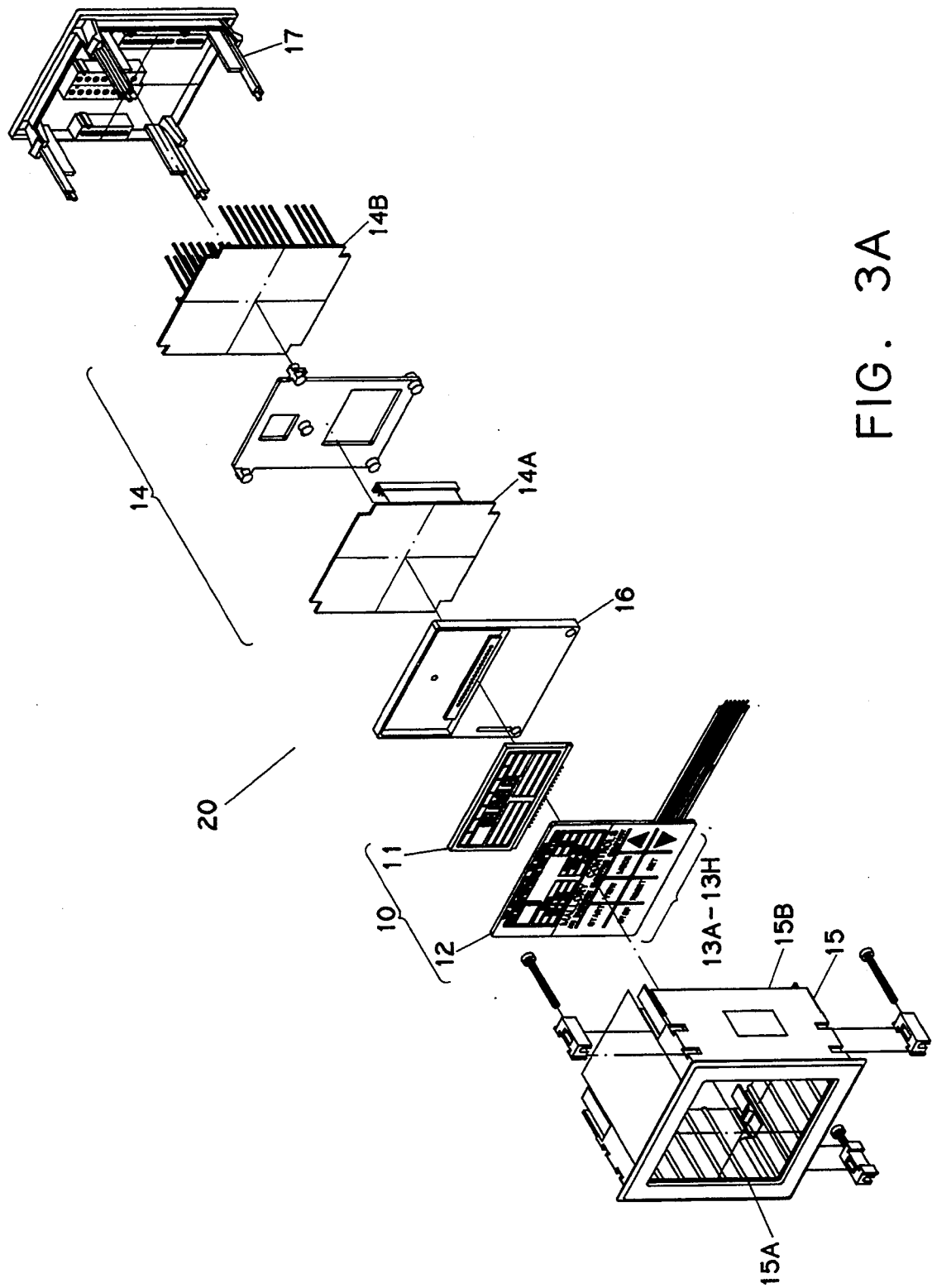
FIG. 3 includes two break-away drawings of a universal controller of the invention to illustrate its structure and arrangement (FIGS. 3A and 3B) and a breakaway drawing and front views to illustrate a means of the invention for providing variable annunciation of information (FIGS. 3B–3E)
Figure 3B:
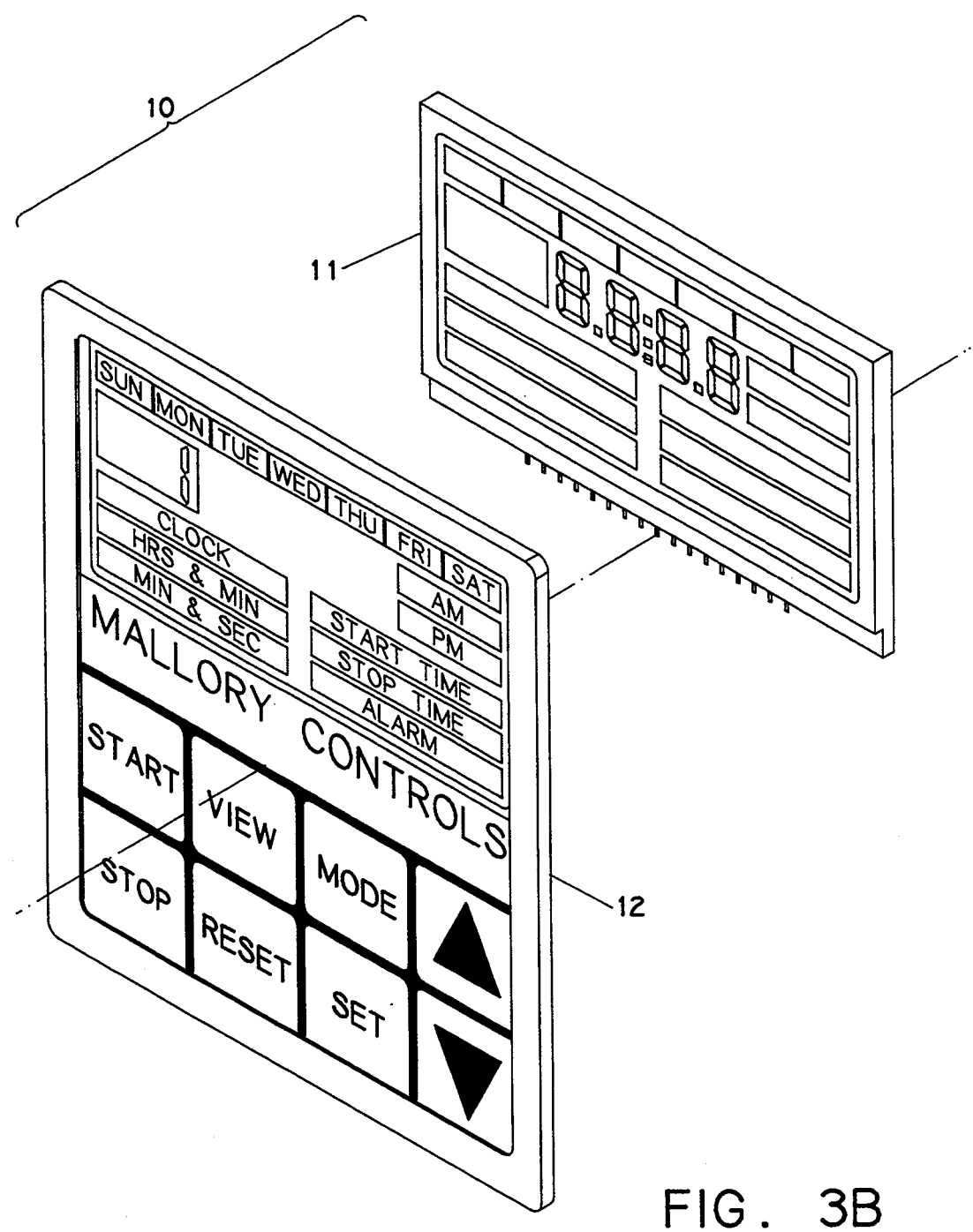
Figure 3C:
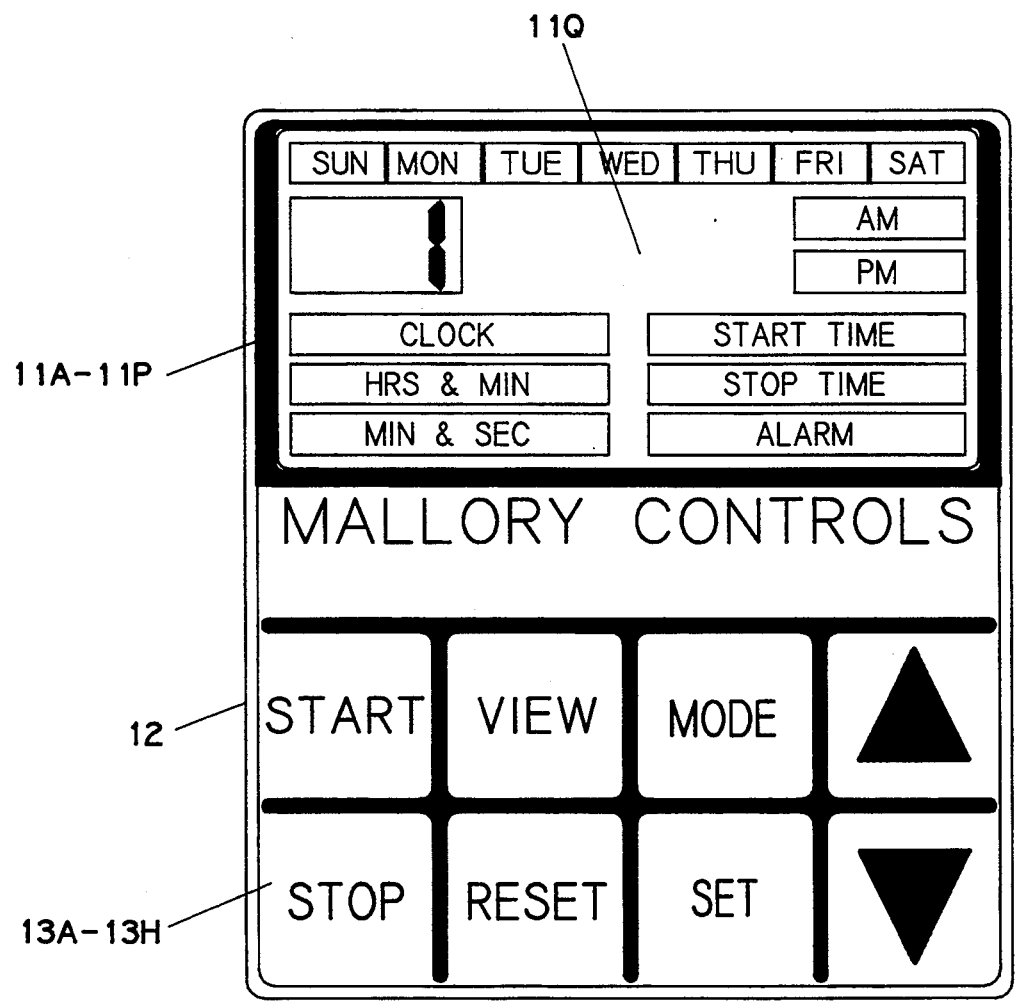
Figure 3D:
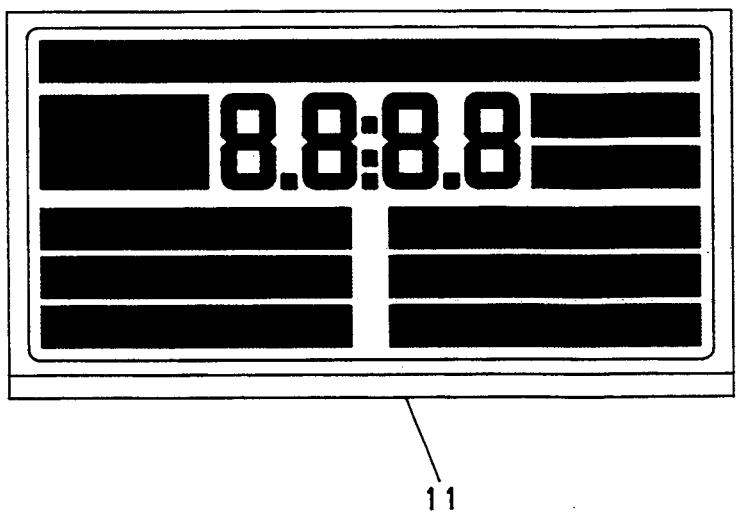
Figure 3E:
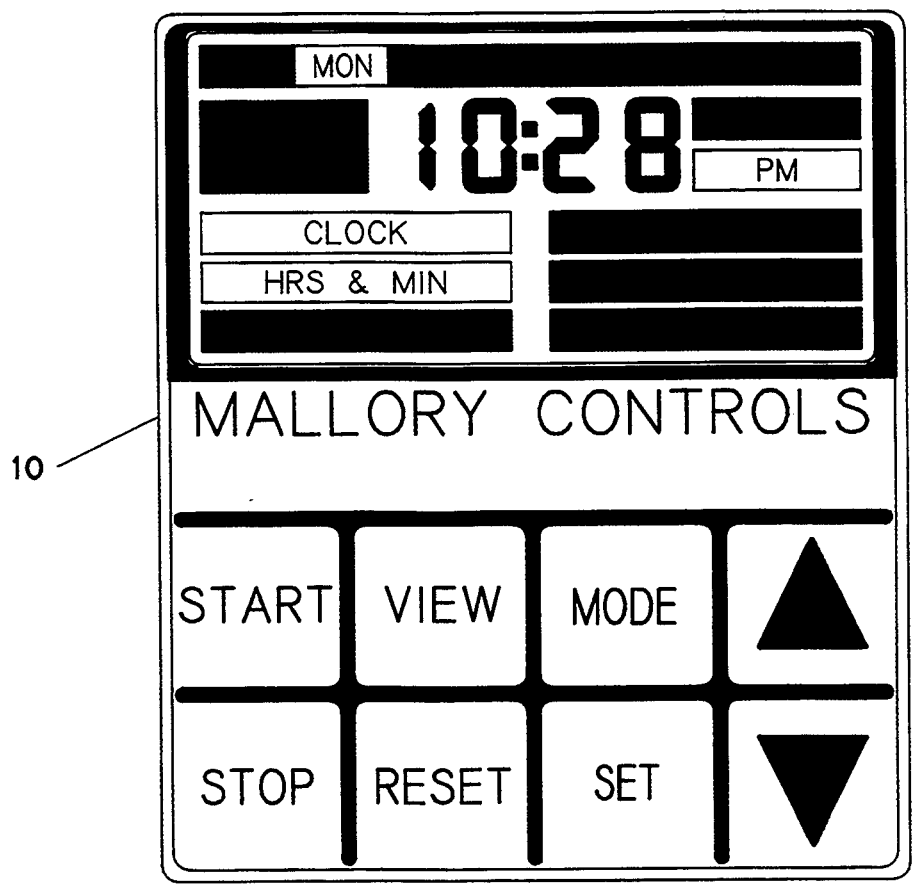
Figure 4B:
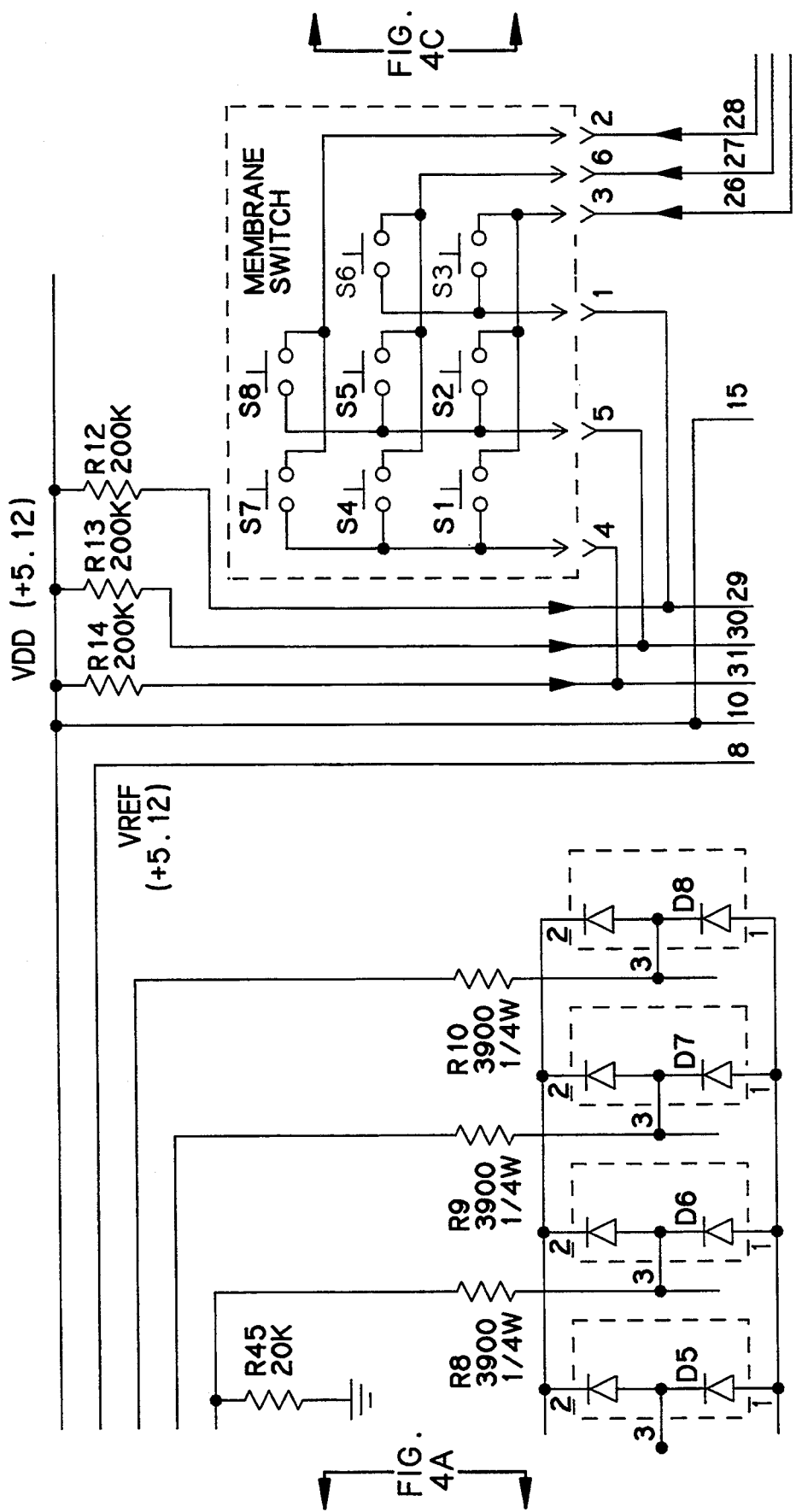
FIGS. 4 and 5 are circuit diagrams for one preferred embodiment of a universal controller of the invention, FIG. 4 comprising a circuit diagram of a microprocessor subassembly and FIG. 5 comprising a circuit diagram of a power supply for the microprocessor circuit of FIG. 4.
Figure 4C:
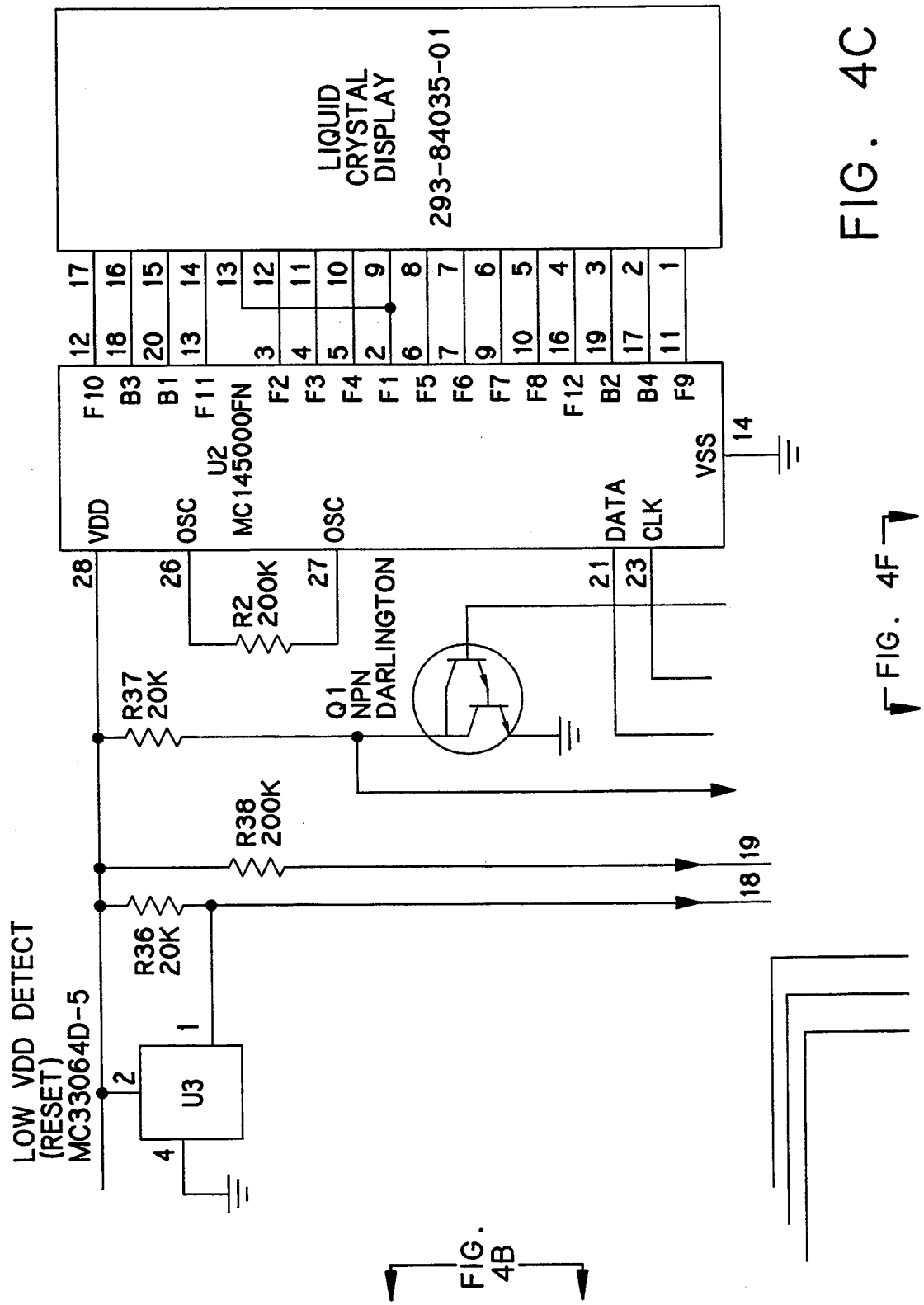
Figure 4F:
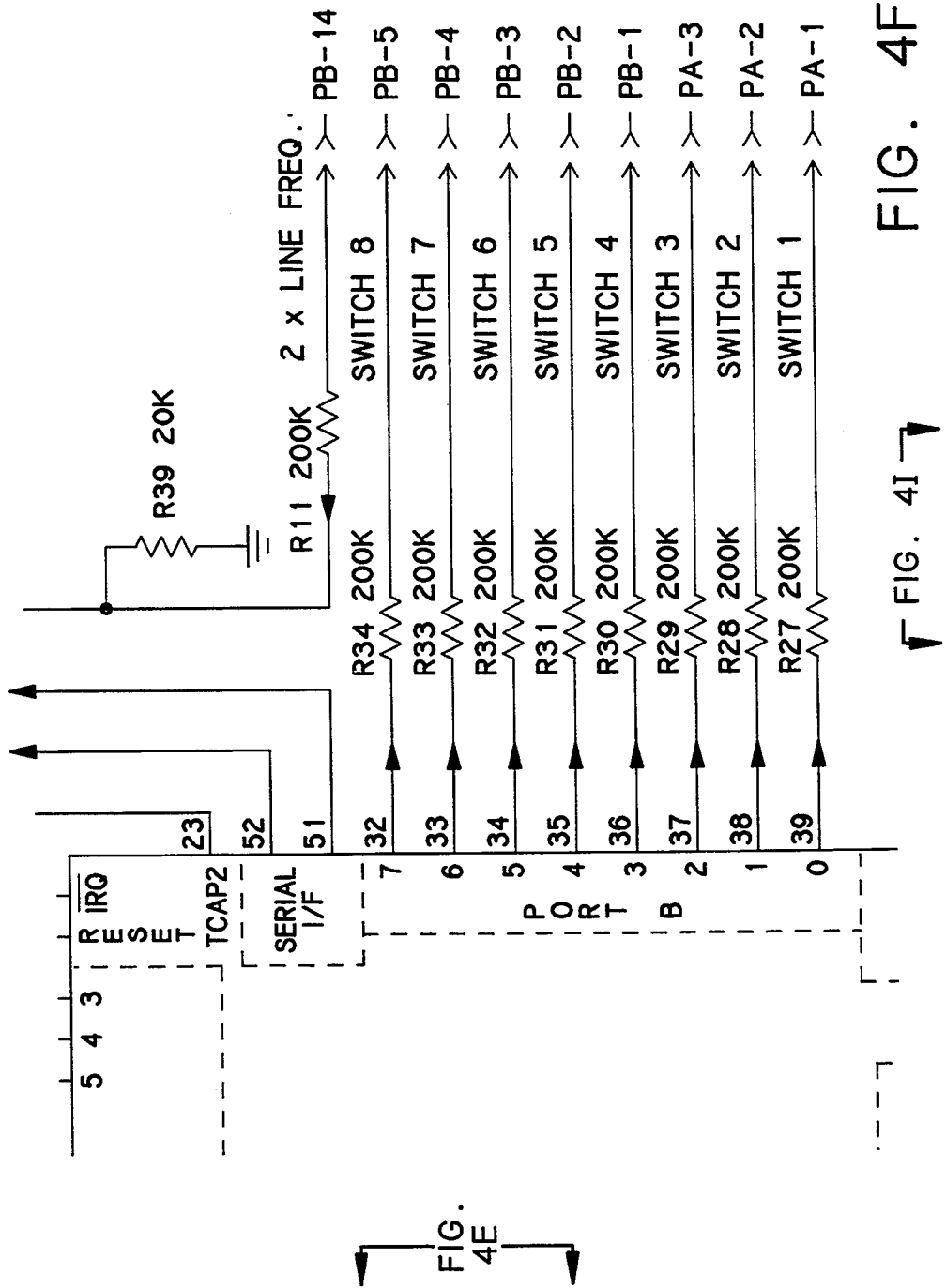
Figure 4I:
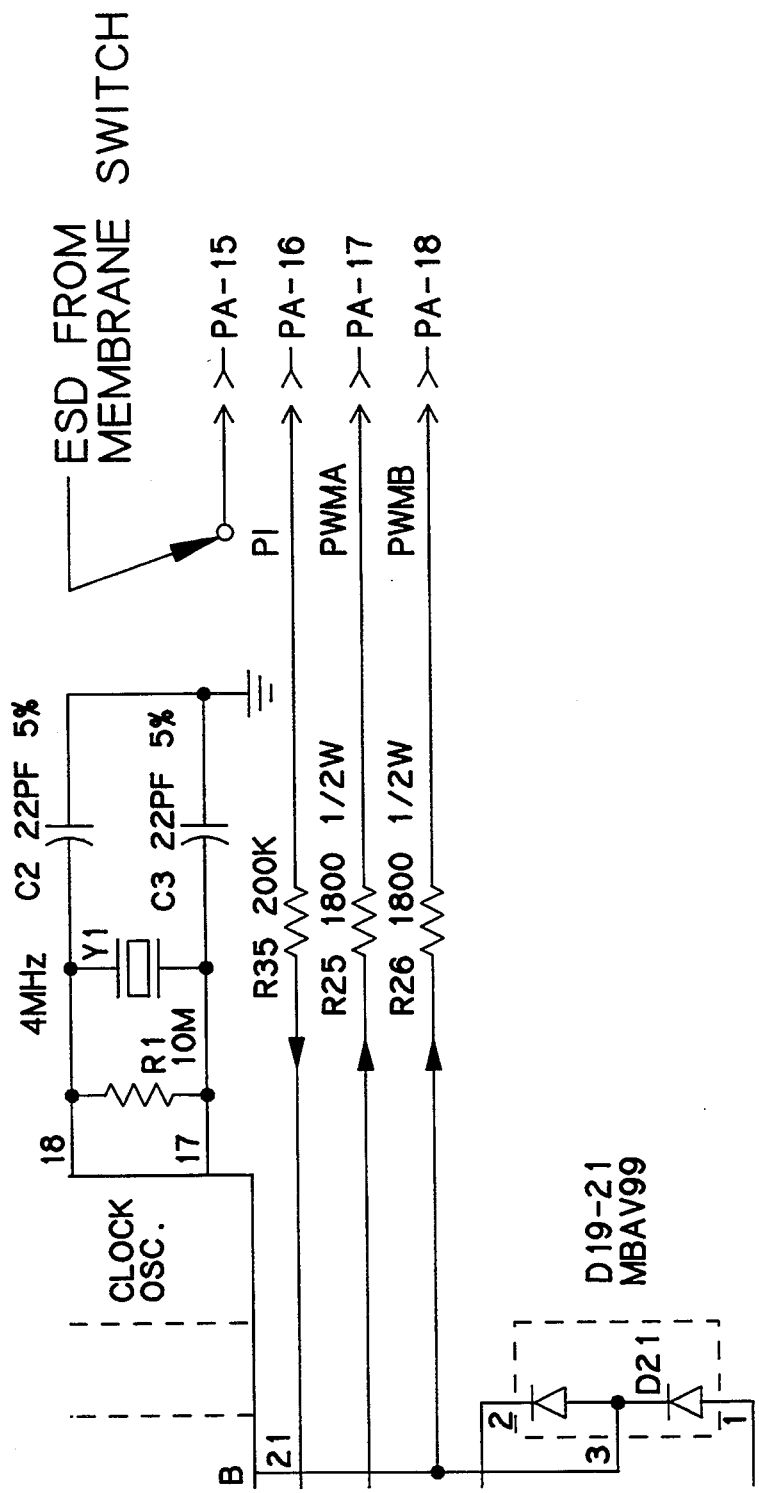

As shown in FIGS. 3A and 3B, the variable area illumination means 11, transparent indicia-bearing sheet 12 and plurality of switches 13a–13h can be carried as a unit by housing 15. The variable area illumination means 11, transparent indicia-bearing sheet 12 and plurality of switches 13a–13h can also comprise a subassembly carried by a support 16.

A universal controller 20 of the invention can comprise a programmable controller 14, a variable area illumination means 11 connected with the programmable controller 14, a plurality of control switches 13a–13h connected with the programmable controller 14 and a transparent indicia-bearing overlay 12. In such a universal controller, the transparent indicia-bearing overlay carries a plurality of different indicia 12 which can, in part, identify the control switches 11a–11h as indicated on FIG. 3 and in part can identify various controller outputs. In the invention, the variable area illumination means 11 is operated by the programmable controller 14 to illuminate one or more of the plurality of different indicia on a transparent indicia-bearing overlay to display selected controller outputs.

As indicated above, a preferred universal controller 20 of the invention includes, as the variable area illumination means 11, an LCD screen providing a plurality of illumination sites. A plurality of control switches 13a–13h are arranged in a planar array carried adjacent the variable area illumination means 11. Preferably the control switches 13a–13h comprise pressure membrane switches overlaid in their entirety by a flexible sheet 12 and the arrangement can provide a planar front face of the controller shown in FIGS. 1 and 3. The transparent indicia-bearing sheet 12 is preferably a transparent thermoplastic material, a preferred such transparent sheet being made of mylar material. The flexibility of the mylar sheet 12 permits operation of the preferred pressure membrane switches 13a–13h at the face 15a of housing 15.

As indicated in FIGS. 3–5, the universal controller 10 comprises a programmable controller having a circuit like that shown in FIG. 4 in a subassembly 14a, and can further comprise a power supply for the programmable controller and the variable area illumination means, with a circuit such as that shown in FIG. 5 on a separate subassembly 14b. The housing 15 can carry the programmable controller 14, the variable area illumination means 11, the plurality of input control switches 13a–13h and the transparent indicia-bearing overlay 12. Programmable controller subassembly 14a and power supply subassembly 14b are carried by said housing on at least one circuit board (two circuit boards in FIG. 3A) and spaced immediately behind display screen control switch assembly 10. As indicated in the break-away view of FIG. 3A, a carrier spacer 16 and the printed circuit boards 14a and 14b making up microprocessor 14 are carried within the four walls of housing 15. As shown in FIGS. 2 and 3A, the housing of the universal controller is closed at its rear with a cover 17 and the plurality of input connection means and output connection means extend from at least one of the circuit board assemblies (14b as shown in FIG. 3A) to and through the cover 17, as shown in FIG. 2.

As shown in FIG. 3A, housing 15 comprises a four-sided housing having an open face 15a and an open back 15b. When the means 10 providing variable annunciation of information is carried by housing 15 the variable area illumination means 11, a plurality of switches 13a–13h and the flexible transparent indicia-bearing sheet 12 are located in the open face 15a so that operators may operate the switches 13a–13h and view the indicia displayed by the variable area illumination means 11.

FIGS. 4 and 5 show the circuits making up the programmable controller (FIG. 4) and its power supply (FIG. 5). The individual circuit elements making up the circuits of FIGS. 4 and 5 are identified in the Figures. As shown in FIGS. 4 and 5, eight output devices S1–S8 may be connected to the universal controller through connections J2-1 through J2-5 and J3-1 through J3-8 at the right of FIG. 5. The output devices may be connected through the eight opto-isolation circuits at the right of FIG. 5 and associated amplifiers to the microcontroller of FIG. 4 through connections JA-1 through JA-3 and JB-1 through JB-5 at the bottom of FIG. 5, and the corresponding connections PA-1 through PA-3 and PB-1 through PB-5 at the right of FIG. 4. A signal of two times line frequency is coupled from the power supply circuit of FIG. 5 through connection JB-14 at the bottom of FIG. 5 to the corresponding connection PB-14 at the right of FIG. 4. Furthermore, connections JB-15 through JB-18 at the bottom of FIG. 5 are connected to the corresponding connections PB-15 through PB-18 at the left of FIG. 4. Connections PA-4 through PA-13 and PB-6 through PB-13 at the left of FIG. 4 are connected to the corresponding connections JA-4 through JA-13 and connections JB-6 through JB-13 at the left of FIG. 5. Connections PA-15 through PA-18 at the right of FIG. 4 are connected to connections JA-15 through JA-18 at the left of FIG. 5. Connections J2-5 through J2-8 at the left of FIG. 5 comprise power inputs to the power supply circuit of FIG. 5. Connections J1-1 through J1-18 and J4-1 through J4-11 comprise the input and output connections, other than for outputs S1 through S8 at the back of the controller 20 (as shown in FIG. 2). The connections from the programmable controller 14, i.e., microcontroller subassembly of FIG. 4 on subassembly 14a of FIG. 3, and power supply of FIG. 5 on subassembly 14b, extend through the back cover 17 as indicated in FIGS. 2 and 3.

The membrane switches and their interconnections to the microprocessor are shown immediately above the microcontroller U1 in FIG. 4. As shown at the left of FIG. 4, the plurality of inputs represented by connections PA-4 through PA-13 and PB-6 through PB-13 are connected to the microcontroller U1 through voltage limiting circuits protect the microcontroller from spurious and damaging voltages.

The connection +12 V RAW at the top of FIG. 5 is connected to J4-10 at the correspondingly identified arrow at the left of FIG. 5. The connection +5 REGULATED at the top of FIG. 5 is connected to the connection J1-11 at the left of FIG. 5 at the correspondingly identified arrow +5 V REG. at the left of FIG. 5.

As indicated on FIG. 4, the programmable controller preferably comprises a programmable microprocessor sold by Motorola under their part number MC68HC0B4CFN or MC68HCO5B6CFN. Such programmable microprocessors provide a non-volatile programmable read only memory (4K or 6K, respectively), a random access memory of 176 bytes and a non-volatile electrically erasable programmable read only memory of 256 bytes. The programmable read only memories of these Motorola microprocessors are capable of storing a variety of control programs for controlling a variety of processes and machinery in a variety of applications. The electrically erasable programmable read only memory of this Motorola microprocessor can be programmed from the plurality of control switches 13a–13h to store, in its non-volatile memory, selectable information from the controller inputs or the control program and, upon command, to display the stored information on the display device comprising the variable area illumination means, in graphic or alphanumeric form.

As indicated in FIGS. 2 and 5, the universal controller can provide a regulated 5-volt output and has a common 12-volt input and output. The common 12-volt input/output is at connection J4-10 which connects with the arrowed indication +12 V RAW at the top of FIG. 5. This feature permits the universal controller of the invention to be powered by an input from shipboard 12-volt power sources, in addition to 24-volt, 115-volt and 220-volt AC sources.

As indicated in FIG. 4, the programmable microprocessor can also be provided with a crystal-controlled high-frequency clock input. Such a crystal-controlled input can provide an accurate 4 megahertz signal to the microprocessor. The microprocessor can thus be programmed to determine the actual frequency of the AC power input, compare the actual AC power frequency with its standard frequency, and provide a signal to disconnect a controlled device, such as an AC induction motor or other frequency-sensitive device, from the AC power if the actual AC power frequency falls outside of preselected limits of frequency.

As shown in FIG. 5, a 9-volt back-up battery may be connected to the connection J1-18 at the left of FIG. 5. The +9-volt battery line at the lower left of FIG. 5 connects with the +9-volt battery line at the upper left of FIG. 5. Connection of a 9-volt battery to the J1-18 terminal at the left of FIG. 5 provides back-up power to the universal controller. Such back-up power will prevent the loss of information stored in the volatile memory of the microprocessor in the event of a power failure. As further protection against loss of stored information, the microprocessor is provided with a battery voltage monitoring circuit to detect low voltage (shown in FIG. 4). The microprocessor can be programmed to periodically sample back-up battery voltage and provide an output when the sampling data indicates the battery needs replacement. The microprocessor can thus be provided with a program to operate a display of information at the variable area illumination device 11 indicating the need to replace the back-up battery.

The universal controller of the invention can provide a variety of outputs. It can provide, for example, two pulse-width modulated outputs and up to eight outputs to operate AC switches through, for example, optoisolated triacs, or through buffer amplifiers, other power relays or power switches. The controller thus can provide digital outputs to fit a variety of control applications.

Figure 6:
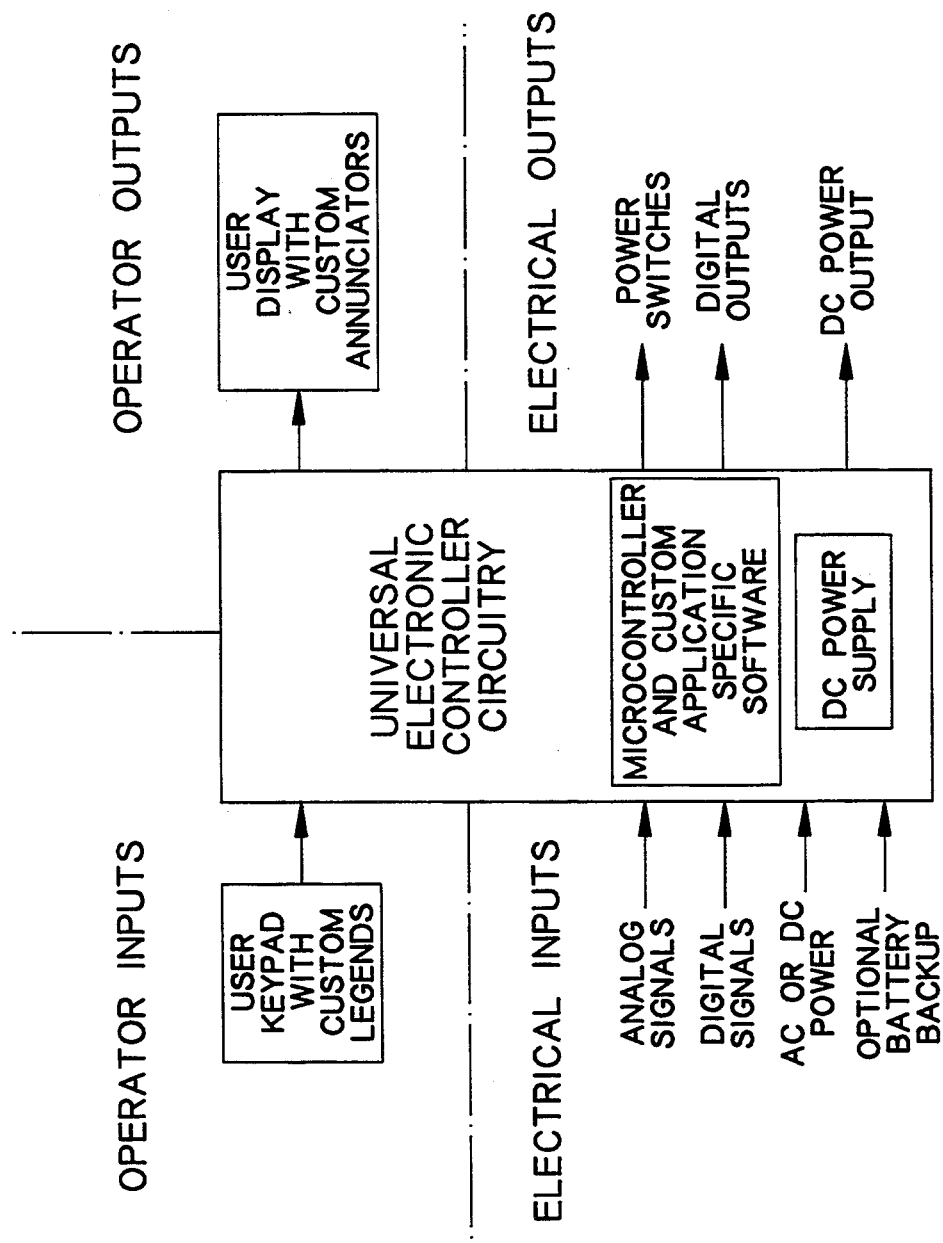
FIG. 6 is a block diagram of a universal controller of the invention.

FIG. 6 is a block diagram organized to illustrate the various inputs and outputs that may be obtained with universal controllers of the invention.

A universal controller of the invention can be provided within a small, easily-used package, which can be on the order of 4 inches wide by 4 inches high and about 2½ inches deep.

The number of applications in which the universal controller can be used are too many and varied to provide an exhaustive list. However, examples of the applications of such controllers include the control of a variety of food preparing operations; the control of refrigeration apparatus; the control of cleansing operations for dairy equipment; the control of AC and DC motors; the control of timing and counting operations; temperature, level, pressure, humidity and pH control; and the control of voltage and current in various applications.

While the drawings and descriptions above disclose a preferred embodiment of the invention, it should be understood that the scope of the invention is limited only by the prior art and the claims that follow.

What is claimed is:

1. A versatile programmable electronic controller, comprising:
    a programmable microprocessor including a non-volatile programmable read only memory, a random access memory and a non-volatile electrically erasable programmable read only memory;
    a plurality of voltage-limited inputs connected with said microprocessor;
    a plurality of control switches connected with said microprocessor having predetermined functions that are programmed by said non-volatile programmable read only memory;
    a display device connected with said microprocessor;
    a plurality of microprocessor outputs;
    a power supply for said microprocessor and said display device;
    said electrically erasable programmable read only memory is programmable from said plurality of control switches to store selectable information and to display said information on said display device wherein said selectable information regulates operation of said programmable read only memory, and
    said programmable read only memory stores an application control program that configures said plurality of control switches to represent predetermined criteria, and configures said display device to annunciate predetermined messages.

2. The versatile programmable electronic controller of claim 1 wherein said display device is a variable area illumination device including a portion adapted for control by said microprocessor to provide alphanumeric information.

3. The versatile programmable electronic controller of claim 1 wherein said power supply has a regulated 5-volt output and a common 12-volt input and output.

4. The versatile programmable electronic controller of claim 1 further comprising a crystal-controlled high frequency clock input to said microprocessor.

5. The versatile programmable electronic controller of claim 1 comprising a back-up battery, a battery voltage monitoring circuit and means to operate said display device to signal a need for battery replacement.

6. The versatile programmable electronic controller of claim 4 comprising a frequency monitoring circuit to compare the actual frequency of an AC power input with the standard frequency of the AC power input and means to disconnect a controlled device from the AC power input if the actual AC power input frequency is outside of preselected limits of frequency.

7. The versatile programmable electronic controller of claim 1 wherein said application control program is a program selected from the group consisting of: a food preparation program, a refrigeration program, a dairy equipment cleansing program, a timing and counting operations program, or a motor control program.

8. The electronic controller annunciator of claim 1 wherein said selectable information is selected from the group consisting of: time, temperature, position, and revolutions per minute.

9. The versatile programmable electronic controller of claim 1 wherein said display device comprises: a variable illumination means having a plurality of independently illuminatable areas.

10. The versatile programmable electronic controller of claim 9 wherein said display device further comprises: a transparent indicia-bearing overlay.

11. The versatile programmable electronic controller of claim 10 wherein said transparent indicia-bearing overlay is adapted to overlay said variable illumination means and provide a plurality of indicia, each indicia of said plurality being located over one of a plurality of independently illuminated areas so that said variable illumination means may illuminate and display selected indicia of said transparent indicia-bearing overlay.

12. The electronic controller annunciator of claim 1 wherein the power supply has input and output values selected to permit operation over a range of AC input voltages selected from the group consisting of: 20–28 VAC, 90–132 VAC, or 180–270 VAC.

13. A versatile programmable electronic controller, comprising:
    (a) a housing;
    (b) a power supply;
    (c) a programmable microprocessor including a non-volatile programmable read only memory, a random access memory and a non-volatile electrically erasable programmable read only memory;
    (d) a plurality of voltage-limited inputs connected with the microprocessor;
    (e) a plurality of outputs connected with the microprocessor;
    (f) a plurality of control switches connected with the microprocessor;
    (g) a display device connected with the microprocessor;
    (h) a user program contained in the non-volatile erasable programmable read only memory entered into the non-volatile erasable programmable read only memory by the control switches to modify the application program; and,
    (i) an application program contained in the non-volatile programmable read only memory that configures the display device and the plurality of control switches and switches the plurality of outputs.

14. The versatile programmable electronic controller of claim 13 wherein said application control program is a program selected from the group consisting of: a food preparation program, a refrigeration program, a dairy equipment cleansing program, a timing and counting operations program, or a motor control program.

15. The versatile programmable electronic controller as recited in claim 13 wherein the user program selects information from the application control program and display the information on the display device by an operator selecting among the plurality of control switches.

16. The electronic controller annunciator of claim 15 wherein said selectable information is selected from the group consisting of: time, temperature, position, and revolutions per minute.

17. The versatile programmable electronic controller of claim 13 wherein said display device comprises: a variable illumination means having a plurality of independently illuminatable areas.

18. The versatile programmable electronic controller of claim 17 wherein said display device further comprises: a transparent indicia-bearing overlay.

19. The versatile programmable electronic controller of claim 18 wherein said transparent indicia-bearing overlay is adapted to overlay said variable illumination means and provide a plurality of indicia, each indicia of said plurality being located over one of a plurality of independently illuminated areas so that said variable illumination means may illuminate and display selected indicia of said transparent indicia-bearing overlay.

20. The electronic controller annunciator of claim 13 wherein the power supply has input and output values selected to permit operation over a range of AC input voltages selected from the group consisting of: 20–28 VAC, 90–132 VAC, or 180–270 VAC.

* * * * *